United States Patent [19]

Kilburn

[11] 4,121,662

[45] Oct. 24, 1978

[54] WATER PURIFICATION WITH FRAGMENTED OIL SHALE

[76] Inventor: James S. Kilburn, 3060 B-1/2 Rd., Grand Junction, Colo. 81501

[21] Appl. No.: 803,049

[22] Filed: Jun. 3, 1977

[51] Int. Cl.$^2$ .................... E21B 43/24; B01D 17/02
[52] U.S. Cl. .................... 166/259; 166/265; 166/267; 208/11 R; 210/65; 299/2
[58] Field of Search ............... 166/256, 259, 261, 267, 166/272, 274, 265; 299/2; 208/11 R; 210/65, 80, 170

[56] References Cited

U.S. PATENT DOCUMENTS

| 2,217,143 | 10/1940 | Stevenson | 166/267 |
|---|---|---|---|
| 2,609,331 | 9/1952 | Cheney | 208/11 R X |
| 3,401,114 | 9/1958 | Carlton et al. | 210/80 X |
| 3,459,003 | 8/1969 | O'Neal | 61/35 |
| 3,461,963 | 8/1969 | Dew et al. | 166/272 X |
| 3,537,528 | 11/1970 | Herce et al. | 166/259 X |
| 3,547,190 | 12/1970 | Wilkerson | 166/267 X |
| 3,565,171 | 2/1971 | Closmann | 166/247 |
| 3,588,175 | 6/1971 | Whiting | 299/11 |
| 3,593,789 | 7/1971 | Prats | 166/259 |
| 3,649,533 | 3/1972 | Reijonen et al. | 210/170 X |
| 3,900,395 | 8/1975 | Hirs | 210/80 |
| 4,014,575 | 3/1977 | French et al. | 166/267 X |
| 4,036,299 | 7/1977 | Cha et al. | 166/261 |

Primary Examiner—Stephen J. Novosad
Assistant Examiner—George A. Suchfield
Attorney, Agent, or Firm—Christie, Parker & Hale

[57] ABSTRACT

Impurities are removed from impure water by introducing the impure water into a fragmented permeable mass of particles containing raw oil shale. The water introduced can be water containing hydrocarbons such as water obtained from retorting oil shale or water containing suspended solids such as blowdown from a steam generator. After introducing impure water into the fragmented permeable mass, the mass of particles can be retorted. This is particularly advantageous when the introduced water contains hydrocarbons because at least part of the hydrocarbons removed from impure water can be recovered by retorting.

26 Claims, 1 Drawing Figure

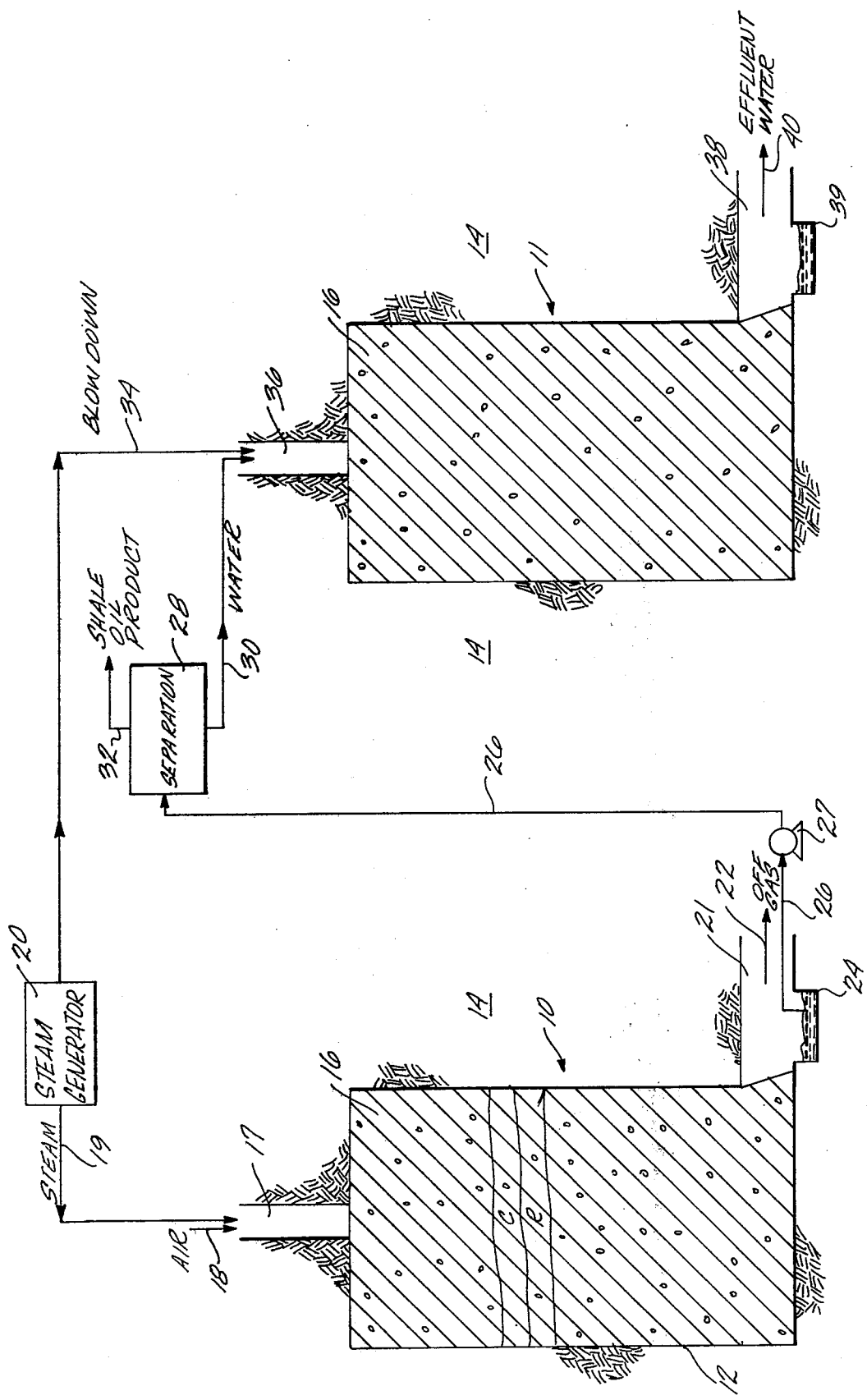

WATER PURIFICATION WITH FRAGMENTED OIL SHALE

BACKGROUND

The presence of large deposits of oil shale in the Rocky mountain region of the United States has given rise to extensive efforts to develop methods of recovering shale oil from kerogen in the oil shale deposits. It should be noted that the term "oil shale" as used in the industry is in fact a misnomer; it is neither shale nor does it contain oil. It is a sedimentary formation comprising marlstone deposit interspersed with layers containing an organic polymer called "kerogen", which upon heating decomposes to produce carbonaceous liquid and gaseous products. It is the formation containing kerogen that is called "oil shale" herein, and the liquid carbonaceous product is called "shale oil".

A number of methods have been proposed for processing the oil shale which involve either first mining the kerogen bearing shale and processing the shale above ground, or processing the shale in situ. The latter approach is preferable from the standpoint of environmental impact since the spent shale remains in place, reducing the chance of surface contamination and the requirement for disposal of solid wastes.

The recovery of liquid and gaseous products from oil shale deposits has been described in several patents, one of which is U.S. Pat. No. 3,661,423, issued May 9, 1972 to Donald E. Garrett, assigned to the assignee of this application, and incorporated herein by reference. This patent describes in situ recovery of liquid and gaseous hydrocarbon materials from a subterranean formation containing oil shale by mining out a portion of the subterranean formation and then fragmenting and expanding a portion of the remaining formation to form a fragmented, stationary, permeable mass of formation particles containing oil shale, referred to herein as an in situ oil shale retort. Hot retorting gases are passed through the in situ oil shale retort to convert kerogen contained in the oil shale to liquid and gaseous products.

One method of supplying hot retorting gases used for converting kerogen contained in the oil shale, as described in U.S. Pat. No. 3,661,423, includes establishment of a combustion zone in the retort and introduction of a combustion zone feed containing oxygen downwardly into the combustion zone to advance the combustion zone downwardly through the retort. The combustion zone feed can contain steam provided by a steam generator to improve efficiency of retorting. In the combustion zone oxygen in the combustion zone feed is depleted by reaction with hot carbonaceous materials to produce heat and combustion gas. By the continued introduction of the oxygen supplying combustion zone feed downwardly into the combustion zone, the combustion zone is advanced downwardly through the retort.

The effluent gas from the combustion zone comprises combustion gas and any gaseous portion of the combustion zone feed that does not take part in the combustion process. This effluent gas passes through the retort on the advancing side of the combustion zone to heat the oil shale in a retorting zone to a temperature sufficient to produce kerogen decomposition, called retorting, in the oil shale to gaseous and liquid hydrocarbon products and a residue of solid carbonaceous material.

The liquid products and gaseous products are cooled by cooler oil shale fragments in the retort on the advancing side of the retorting zone. An off gas containing combustion gas generated in the combustion zone, product gas produced in the retorting zone, gas from carbonate decomposition, and any gaseous combustion zone feed that does not take part in the combustion process is withdrawn to the surface. Liquid hydrocarbon products, together with water produced in or added to the retort, are also withdrawn to the surface as a liquid product stream through an access tunnel, drift or shaft. The liquid hydrocarbon products are separated from the water in the liquid product stream using methods such as decanting.

Water recovered from the retorting operation can contain up to about 1% by volume of shale oil and related hydrocarbons. The presence of hydrocarbons in the water renders it useless for many applications without costly purification. Disposal of blowdown from the unit used for generation of steam for introduction to the retort as part of the oxygen supplying gaseous feed mixture can be a problem. Because the blowdown is heavily contaminated by dissolved and suspended mineral solids, it is useless for many applications without costly purification.

Methods proposed for purifying water recovered as liquid product from retorting and steam generator blowdown include use of settling basins, filters, screens, skimmers, flocculating agents, trickling filters, biofilters, osmotic filters, ion exchange resins and the like. However, all these methods require investment in capital equipment and maintenance and operating expenses. Furthermore, recovery of the valuable hydrocarbons contained in the water from a retorting operation may not be practical with these methods.

Therefore, there is a need for a simple, inexpensive, economical method for removing impurities from water such as hydrocarbons contained in water from retorting and solids contained in steam generator blowdown.

SUMMARY

The present invention concerns a method having the above features for removing impurities from water. According to this method, water containing impurities is introduced into a fragmented permeable mass of particles containing raw oil shale to remove the impurities. This water of relatively lower impurity concentration can be withdrawn from the mass of particles.

This method is useful for removing hydrocarbon impurities from water such as water separated from a liquid product stream obtained by retorting oil shale. This method is also useful for removing solids from water such as blowdown obtained from a steam generator used for providing steam for retorting oil shale.

The fragmented mass of particles can be retorted and/or combusted after introducing the water. By retorting the fragmented mass, introduced water remaining in the fragmented mass and hydrocarbon impurities separated by the fragmented mass can be recovered.

Preferably the fragmented permeable mass of particles is contained in an in situ oil shale retort in a subterranean formation containing oil shale because of environmental considerations. Since the fragmented mass containing oil shale remains in place under ground, the chance of surface contamination by the impurities removed from the water is reduced.

DRAWING

These and other features, aspects and advantages of the present invention will become more apparent upon consideration of the following description, appended claims, and accompanying drawing which schematically represents in vertical cross section a first and second in situ oil shale retort, where the first in situ retort is producing water containing impurities which are removed from the water in the second in situ retort.

DESCRIPTION

Referring to the drawing, an active in situ oil shale retort 10 and an inactive oil shale retort 11 are each in the form of a cavity 12 in an unfragmented subterranean formation 14 containing oil shale. Each cavity contains a fragmented permeable mass 16 of formation particles containing oil shale, with the inactive retort 11 containing raw oil shale.

The fragmented mass can have a wide distribution of particle sizes. For example, an in situ oil shale retort in the Piceance Creek Basin of Colorado prepared by explosive expansion of formation toward a void contains a fragmented permeable mass consisting of about 58% by weight particles having a weight average diameter of 2 inches, about 23% by weight particles having a weight average diameter of 8 inches, and about 19% by weight particles having a weight average diameter of 30 inches. Each cavity 12 can be created simultaneously with fragmentation of the mass of formation particles 16 contained therein by blasting by any of a variety of techniques. A desirable technique involves excavating a void within the in situ oil shale retort site and explosively expanding remaining oil shale in the site toward the void. A method of forming an in situ oil retort is described in U.S. Pat. No. 3,661,423. A variety of other techniques can also be used.

A conduit 17 communicates with the top of the fragmented mass of formation particles 16 in the active retort 10. There is a combustion processing zone C established in the retort advanced downwardly through the retort 10 by introduction of a combustion zone feed containing an oxygen supplying gas into the in situ oil shale retort through the conduit 17. The oxygen supplying gas can be air 18 or air mixed with other gases such as steam 19 from a steam generator 20. As the gaseous feed is introduced to the retort, oxygen oxidizes carbonaceous material in the oil shale to produce combustion gas. Heat from the exothermic oxidation reactions carried by flowing combustion gas advances the combustion zone downwardly through the fragmented mass of particles.

Combustion gas produced in the combustion zone and any gaseous unreacted portion of the combustion zone feed are passed through the fragmented mass of particles on the advancing side of the combustion zone to a retorting processing zone R on the advancing side of the combustion zone. Kerogen in the oil shale is retorted in the retorting zone to liquid and gaseous products. As used herein, by the term "active retort", there is meant a retort undergoing retorting and/or combustion, and by the term "inactive retort", there is meant a retort undergoing neither retorting nor combustion. As used herein, the term "retorted oil shale" refers to oil shale heated to sufficient temperature to decompose kerogen in an environment substantially free of free oxygen so as to leave a solid residual carbonaceous material. The term "combusted oil shale" refers to oil shale of reduced carbon content due to oxidation by a gas containing free oxygen. The term "raw oil shale" refers to oil shale which has not been subjected to any processing for decomposing kerogen in the oil shale.

There is an adit, tunnel, drift, 21 or the like in communication with the bottom of the active retort 10. An off gas 22 containing gaseous products, combustion gases, gas from carbonate decomposition, and any gaseous unreacted portion of the combustion zone feed is withdrawn from the active in in situ oil shale retort 19 by way of the drift 21 or via a conduit (not shown).

The drift contains a sump 24 in which a liquid product containing water and hydrocarbons is collected. Liquid product is withdrawn through line 26 and transferred by pumping means 27 to separation means 28 such as a decanting vessel, filter or coalescing means, a settling basin or the like in which water 30 is separated from the hydrocarbons or shale oil product 32. The water 30 can comprise water produced by combustion in the retort, water released from formation particles during the retorting operation, and water introduced into the retort such as steam 19 from the boiler 20. The water 30 separated from the shale oil product 32 can contain about 1% by volume hydrocarbon impurities.

Another source of impure water from retorting the mass of particles in the active retort 10 is blowdown 34 from the steam generator 20. The blowdown 34 is water released from the steam generator to maintain the concentration of dissolved and suspended solids in the water inventory in the generator sufficiently low to avoid scale and sludge formation. This blowdown, which can be continuous or intermittent, can contain solids such as sodium phosphate salts, sludge, silica, and the like, which depending upon the pressure used in the steam generator, can range from about 1000 to 3500 parts per million by weight in the boiler blowdown.

Because of the solids contamination of the blowdown 34 and the hydrocarbon contamination of the water 30 from retorting, these water streams are of limited utility for irrigation and most domestic requirements. In addition, these process water streams are unsuitable for generation of steam in a steam generator such as the steam generator 20 used for generating steam for introduction into the active retort 10. These process water streams also are unsuitable for use in mining operations for preparation of an in situ oil shale retort. Water is required in mining operations for wetting down muck piles to avoid dust contamination of air in underground workings with resultant health hazards and explosion potential. Water containing hydrocarbons is unsuitable for this use. Water is also used in mining operations for cooling drill bits and for carrying away cuttings from drill bits. Water containing suspended solids can plug the pumps used for pumping water for these purposes. Since most oil shale formations are in the western United States, where water is a valuable commodity, it is desirable to treat these water streams to render them free of impurities so they can be used for steam generation, mining operations, irrigation, and the like.

Therefore, according to the method of this invention, water containing impurities, such as water 30 obtained from retorting the mass of particles in the active retort 10 and blowdown 34 from the steam generator 20, is introduced through at least one conduit 36 in communication with the upper boundary of the fragmented permeable mass of formation particles containing raw oil shale in the inactive retort 11. At least part of the water percolates downwardly through the retort 11 to be withdrawn from the retort through a drift 38 which is in communication with the bottom of the inactive retort 11. Preferably more than one conduit is used to avoid channeling of water through the center of the fragmented mass and to achieve a uniform distribution of water containing impurities throughout the fragmented mass.

For economy, the conduit 36 used for introducing combustion zone feed to the retort 11 when it is active is utilized for inroducing the water containing impurities into the retort 11. Similarly, the drift 38 used for withdrawing products from the retort 11 when the retort is active is utilized to withdraw from the bottom of the retort 11 effluent water 40 which descends to the bottom of the retort 11. The water 40 withdrawn from the bottom of the retort is of relatively lower impurity concentration than the water introduced to the retort through the conduit 36. This water 40 is collected in a sump 39 in the drift 38 and is withdrawn through the drift via a conduit (not shown). Pumping means (not shown) can be provided for transferring the effluent water 40 to the surface.

It is believed that impurities suspended in the introduced water are removed from the water by a filter-like action where the fragmented body or mass 16 of formation particles in the retort 11 acts as a filter bed to remove suspended oil droplets and mineral particles from the introduced water.

The method of this invention provides great versatility in removing impurities from water. It can be used for removing impurities from blowdown from one or more steam generators and/or impurities from water from one or more oil shale retorts. This method also can be used for removing suspended solids and oils from water streams other than steam generator blowdown and retort water such as municipal waste water, water decanted from oil pumped from oil wells, refinery and chemical plant effluents, and the like.

Preferably there is a sufficient mass of fragmented particles providing a sufficient filtering effect to remove substantially all of the suspended oil and particles in the water introduced to the retort 11. However, with continued addition of impure water to the retort 11, reduced effectiveness of the retort in removing impurities from water can result. When this occurs it can be necessary to pass effluent water 40 containing impurities through additional in situ retorts containing a fragmented permeable mass of formation particles containing oil shale to achieve adequate removal of impurities. Ordinarily one simply switches to another inactive retort.

An advantage of using a permeable mass of particles containing raw oil shale for removing impurities from water, particularly when water containing hydrocarbon impurities is treated, is that the raw oil shale can subsequently be retorted with recovery of at least part of the hydrocarbons removed from the water. In addition, water introduced to the fragmented mass and remaining in the mass can be recovered during the retorting operation. Furthermore, raw oil shale absorbs less water per unit mass of oil shale than does retorted or combusted oil shale. Thus less valuable water is lost by absorption in the fragmented mass of particles when the mass contains raw oil shale than when the mass contains retorted and/or combusted oil shale.

The inactive retort 11, when it is no longer being used for removing impurities from the water, can be retorted using any of a number of methods such as the method used for retorting oil shale particles in the retort 10 as described above. The products of retorting the mass of particles in retort 11 can include water introduced to the retort for purification and hydrocarbons removed from impure water introduced into the retort 11.

The method of this invention has many advantages over prior art processes mentioned above. By utilizing oil shale in situ the purchase of an absorbent, ion exchange resin, filter medium, or the like is avoided. Furthermore, oil shale used remains in the ground, thereby eliminating any disposal problems. Also, since the retort containing the fragmented permeable mass of formation particles containing raw oil shale is formed anyway for recovery of shale oil regardless of any need to purify water, high capital costs for special facilities to remove impurities from water are avoided.

Although the invention has been described in considerable detail with reference to certain versions thereof, other versions of the invention are possible. For example, impure water can be introduced at a level below the top of a mass of particles containing oil shale to flow downwardly by gravity flow, or by pressuring impure water upwardly through a mass of particles containing oil shale. Introducing impure water at a level below the top of a mass of particles containing raw oil shale is desirable so the introduced water does not interfere with ignition of the oil shale at the top of the mass of particles for subsequent retorting.

Because of variations such as these, the spirit and scope of the appended claims should not necessarily be limited to the description of the versions contained herein.

What is claimed is:

1. A method for removing impurities from water comprising the steps of:
   (a) fragmenting subterranean formation containing oil shale to form an in situ fragmented permeable mass of particles containing raw oil shale;
   (b) introducing water having a relatively higher impurity concentration into the in situ fragmented permeable mass of particles containing raw oil shale; and
   (c) withdrawing water of relatively lower impurity concentration from the mass of particles.

2. A method as claimed in claim 1 in which the introduced water contains hydrocarbons.

3. A method as claimed in claim 2 comprising the additional step of retorting the fragmented mass of particles after introducing the water.

4. A method as claimed in claim 1 in which the introduced water comprises blowdown from a steam generator.

5. A method as claimed in claim 1 in which the introduced water comprises water obtained from retorting oil shale.

6. A method as claimed in claim 5 comprising the additional step of retorting the fragmented mass of particles after introducing the water.

7. A method as claimed in claim 1 in whch the fragmented permeble mass is contained in an in situ oil shale report.

8. A method as claimed in claim 7 in which the introduced water contains hydrocarbons, and the method comprises the additional steps of:
   igniting a portion of the fragmented mass of particles for establishing a combustion zone in the fragmented mass;
   introducing into the in situ oil shale retort on the trailing side of the combustion zone a combustion zone feed containing oxygen for advancing the combustion zone through the fragmented mass of particles and producing combustion gas in the combustion zone;

passing said combustion gas and any unreacted portion of the combustion zone feed through a retorting zone advancing through the fragmented mass of particles on the advancing side of the combustion zone, wherein oil shale is retorted and gaseous and liquid products are produced; and withdrawing gaseous and liquid products, including hydrocarbon impurities removed from the water from the in situ oil shale retort from the advancing side of the retorting zone.

9. A method as claimed in claim 8 in which the introduced water is introduced into the top of the retort.

10. A method as claimed in claim 8 in which a top portion of the fragmented mass of particles is ignited and wherein the introduced water is introduced to the retort below the top of the retort.

11. A method for removing impurities from water comprising the steps of:
 (a) introducing water having a relatively higher hydrocarbon impurity concentration into a fragmented permeable mass of particles containing raw oil shale; and
 (b) withdrawing water of relatively lower hydrocarbon impurity concentration from the mass of particles.

12. A method as claimed in claim 11 comprising the additional step of retorting the fragmented mass of particles after introducing the water.

13. A method as claimed in claim 11 in which the introduced water comprises water obtained from retorting oil shale.

14. A method as claimed in claim 11 in which the fragmented permeable mass is contained in an in situ oil shale retort.

15. A method as claimed in claim 14 comprising the additional steps of:
 igniting a portion of the fragmented mass of particles for establishing a combustion zone in the fragmented mass;
 introducing into the in situ oil shale retort on the trailing side of the combustion zone a combustion zone feed containing oxygen for advancing the combustion zone through the fragmented mass of particles and producing combustion gas in the combustion zone;
 passing said combustion gas and any unreacted portion of the combustion zone feed through a retorting zone advancing through the fragmented mass of particles on the advancing side of the combustion zone, wherein oil shale is retorted and gaseous and liquid products are produced; and
 withdrawing gaseous and liquid products, including hydrocarbon impurities removed from the water introduced into in situ oil shale retort, from the advancing side of the retorting zone.

16. A method as claimed in claim 14 in which the introduced water is introduced into the top of the retort.

17. A method for recovering hydrocarbons suspended in water comprising the steps of:
 introducing the water containing hydrocarbons into an oil shale retort containing a fragmented permeble mass of particles containing raw oil shale for removing at least a portion of the hydrocarbons from the water; and
 subsequently retorting the fragmented permeble mass of particles.

18. A method as claimed in claim 17 in which the water comprises water obtained from retorting oil shale.

19. A method as claimed in claim 17 in which the fragmented permeable mass is contained in an in situ oil shale retort in a subterranean formation containing oil shale.

20. A method as claimed in claim 19 in which the introduced water is introduced to the retort at a location below the top of the retort, and the step of retorting comprises the steps of:
 igniting a top portion of the fragmented mass of particles for establishing a combustion zone in the fragmented mass;
 introducing into the in situ oil shale retort on the trailing side of the combustion zone a combustion zone feed containing oxygen for advancing the combustion zone downwardly through the fragmented mass of particles and producing combustion gases in the combustion zone;
 passing said combusio gases and any unreacted portion of the combusion zone feed downwardly through a retorting zone advancing downwardly through the fragmented mass of particles on the advancing side of the combustion zone, wherein oil shale is retorted and liquid products are produced; and
 withdrawing liquid products from the in situ oil shale retort, including hydrocarbon impurities removed from water introduced into the in situ oil shale retort from the advancing side of the retorting zone.

21. A method for recovering liquid products from a first in situ oil shale retort in a subterranean formation containing oil shale, said first in situ retort containing a fragmented permeable mass of particles containing oil shale and having a combustion zone and a retorting zone advancing therethrough, the method comprising the steps of:
 (a) introducing into the first in situ oil shale retort on the trailing side of the combustion zone a combustion zone feed containing oxygen to advance the combustion zone through the fragmented mass of particles and produce combustion gas in the combustion zone;
 (b) passing said combustion gas and any unreacted portion of the combustion zone feed through a retorting zone in the fragmented mass of particles on the advancing side of the combustion zone, wherein oil shale is retorted and liquid products, including water and hydrocarbons, are produced;
 (c) withdrawing a liquid product stream containing water and hydrocarbons from the first in situ oil shale retort;
 (d) separating liquid hydrocarbons from the water leaving water contaminated with residual hydrocarbons; and
 (e) removing residual hydrocarbon contaminants from the water by the steps of:
  (i) introducing the water into a fragmented permeable mass of particles containing raw oil shale in a second in situ oil shale retort in a subterranean formation containing oil shale; and
  (ii) withdrawing water of relatively lower hydrocarbon concentration from the second retort.

22. A method as claimed in claim 21 comprising the additional step of retorting the fragmented mass of particles in the second retort after introducing the water.

23. A method as claimed in claim 21 in which the introduced water is introduced into the top of the second retort and percolates downwardly through the mass of particles in the second retort.

24. A method for recovering liquid products from a first in situ oil shale retort in a subterranean formation containing oil shale, said first in situ retort containing a fragmented permeable mass of particles containing oil shale and having a combustion zone and a retorting zone advancing therethrough, the method comprising the steps of:
 (a) introducing into the first in situ oil shale retort on the trailing side of the combustion zone a combustion zone feed containing oxygen to advance the combustion zone through the fragmented mass of particles and produce combustion gas in the combustion zone;
 (b) passing said combustion gas and any unreacted portion of the combustion zone feed through a retorting zone in the fragmented mass of particles on the advancing side of the combustion zone, wherein oil shale is retorted and liquid products, including water and hydrocarbons are produced;
 (c) withdrawing a liquid product stream containing water and hydrocarbons from the first in situ oil shale retort;
 (d) separating liquid hydrocarbons from the water leaving water contaminated with residual hydrocarbons; and
 (e) removing hydrocarbon contaminants from the water by the steps of:
  (i) introducing the water into a fragmented permeable mass of particles containing raw oil shale in a second in situ oil shale retort in a subterranean formation containing oil shale; and
  (ii) retorting the fragmented mass of particles in the second retort after introducing the water.

25. A method for recovering liquid and gaseous products from a first in situ oil shale retort in a subterranean formation containing oil shale, said first in situ retort containing a fragmented permeable mass of particles containing oil shale, said first in situ retort having a combustion zone and a retorting zone advancing therethrough, the method comprising the steps of:
 (a) producing steam in a steam generator;
 (b) introducing into the first in situ oil shale retort on the trailing side of the combustion zone a combustion zone feed mixture containing steam from the steam generator and sufficient oxygen to advance the combustion zone through the fragmented mass of particles and produce combustion gas in the combustion zone;
 (c) passing said combustion gas, steam, and any unreacted portion of the combustion zone feed through a retorting zone in the fragmented mass of particles on the advancing side of the combustion zone wherein oil shale is retorted and liquid products are produced;
 (d) withdrawing liquid products from the in situ oil shale retort;
 (e) withdrawing water blowdown contaminated with solids from the steam generator; and
 (f) removing solids from the blowdown by introducing the blowdown into a fragmented permeable mass of particles containing raw oil shale in a second in situ oil shale retort in a subterranean formation containing oil shale.

26. A method as claimed in claim 25 comprising the additional step of retorting the fragmented mass of particles in the second retort after introducing the water.

* * * * *

UNITED STATES PATENT OFFICE
CERTIFICATE OF CORRECTION

Patent No. 4,121,662           Dated October 24, 1978

Inventor(s) James S. Kilburn

It is certified that error appears in the above-identified patent and that said Letters Patent are hereby corrected as shown below:

Col. 5, line 8, "inroducing" should be -- introducing -- .
    Col. 6, line 58, "permeble" should be -- permeable --.
    Col. 6, line 16, "report" should be -- retort --.
    Col. 8, line 1, "permeble" should be -- permeable --.
    Col. 8, line 24, "combusion" should be -- combustion -- .
    Col. 8, line 25, "combusion" should be -- combustion --.

Signed and Sealed this

*Thirteenth* Day of *February 1979*

[SEAL]

*Attest:*

RUTH C. MASON
*Attesting Officer*

DONALD W. BANNER
*Commissioner of Patents and Trademarks*